United States Patent [19]

Schoss

[11] Patent Number: 5,428,702

[45] Date of Patent: Jun. 27, 1995

[54] OPTICAL WAVEGUIDE CONNECTOR

[75] Inventor: Udo Schoss, Hattingen, Germany

[73] Assignee: Framatome Connectors Deutschland GmbH, Erkrath, Germany

[21] Appl. No.: 271,036

[22] Filed: Jul. 6, 1994

Related U.S. Application Data

[63] Continuation of Ser. No. 969,226, filed as PCT/EP92/00934, Apr. 29, 1992, abandoned.

[30] Foreign Application Priority Data

Apr. 30, 1991 [DE] Germany ............... 41 14 156.3

[51] Int. Cl.$^6$ ............... G02B 6/00; G02B 6/36
[52] U.S. Cl. .................................................. 385/59
[58] Field of Search ........................... 385/58–61, 385/76, 78, 88, 89, 90, 91, 92

[56] References Cited

U.S. PATENT DOCUMENTS

| | | | |
|---|---|---|---|
| 4,411,491 | 10/1983 | Larkin et al. | 385/59 X |
| 4,744,629 | 5/1988 | Bertoglio et al. | 385/59 |
| 4,779,950 | 10/1988 | Williams | 385/59 X |
| 4,993,803 | 2/1991 | Suverison et al. | 385/88 |
| 5,097,523 | 3/1992 | Marie | 385/59 |
| 5,305,408 | 4/1994 | Schaffer et al. | 385/92 |
| 5,307,435 | 4/1994 | Chihara | 385/92 |
| 5,325,455 | 6/1994 | Henson et al. | 385/78 |

FOREIGN PATENT DOCUMENTS

| | | |
|---|---|---|
| 2113262 | 9/1972 | Germany . |
| 2312015 | 9/1973 | Germany . |
| 3118489 | 11/1982 | Germany . |
| 3522152 | 1/1986 | Germany . |

*Primary Examiner*—Akm E. Ullah
*Attorney, Agent, or Firm*—Perman & Green

[57] ABSTRACT

The invention is concerned with a connector for single-fibre and multi-fibre optical waveguides, preferentially made from plastic material and comprising a male part and a female part each having a plastic housing with guide and locking elements in which housings the end portions of the optical waveguides to be connected are coaxially secured. In accordance with the invention at least the plastic housing (2) of the male part (1) is of integral design and is sealingly secured by moulding to the at least partly bared end portions of the optical waveguides (3, 4).

21 Claims, 2 Drawing Sheets

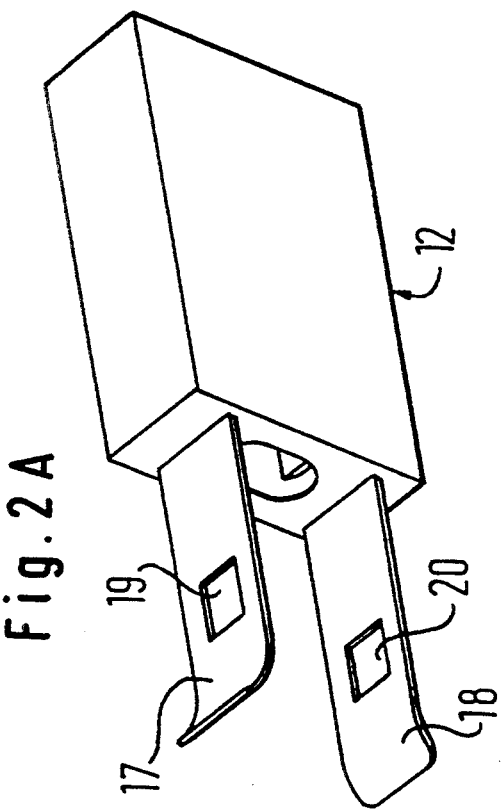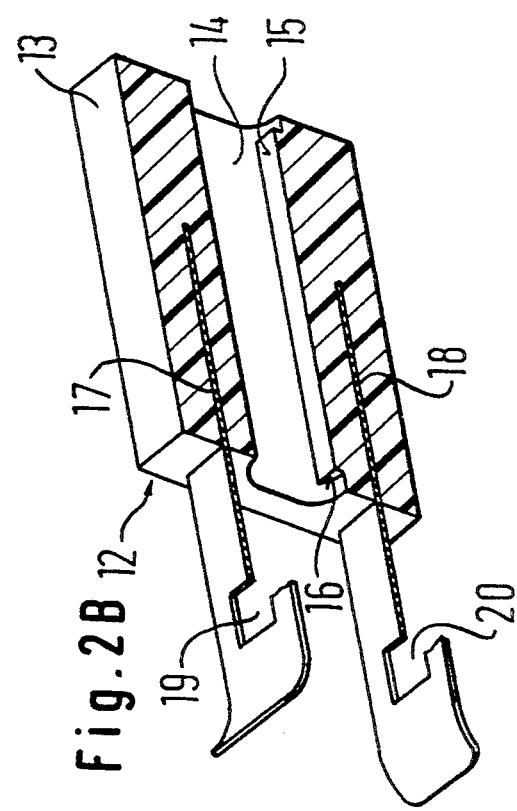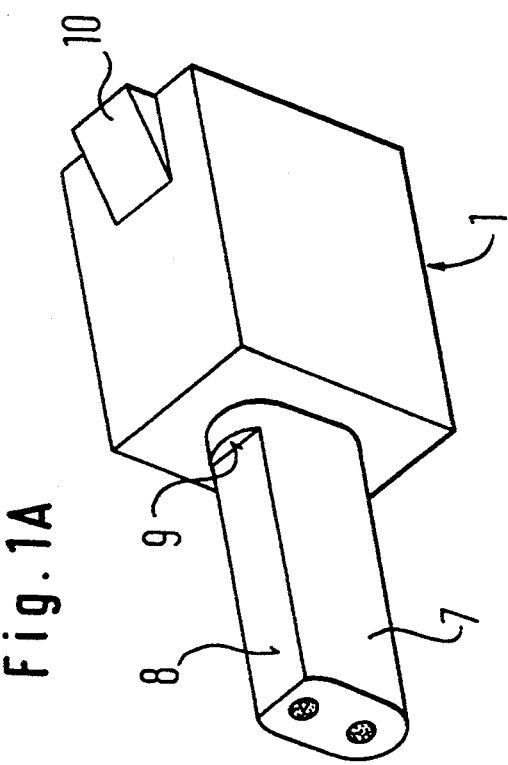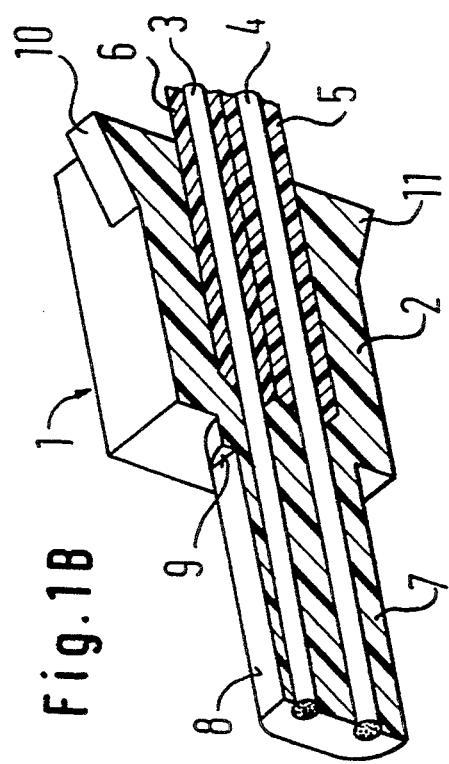

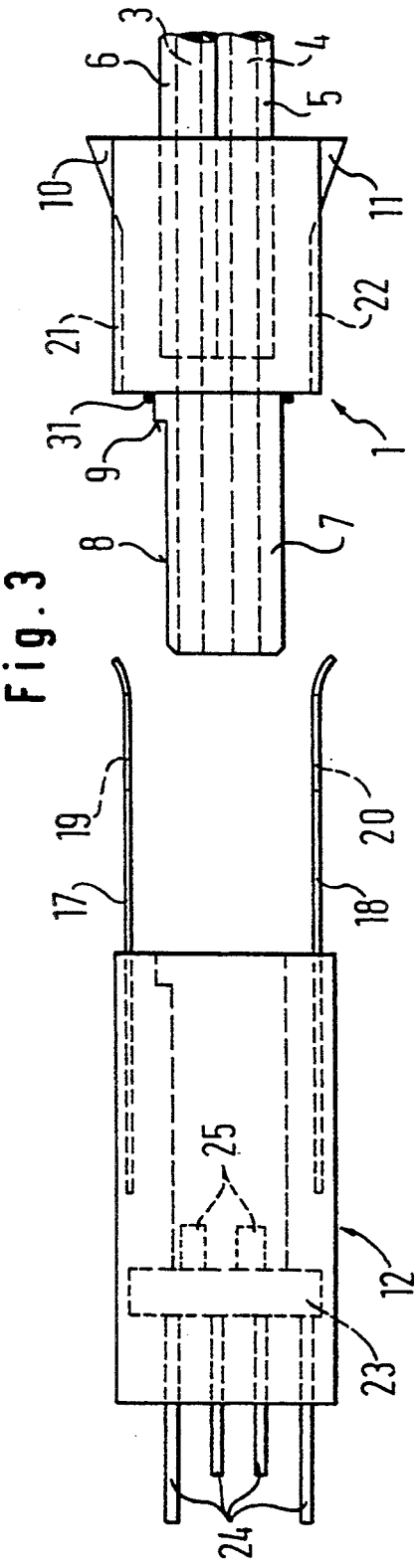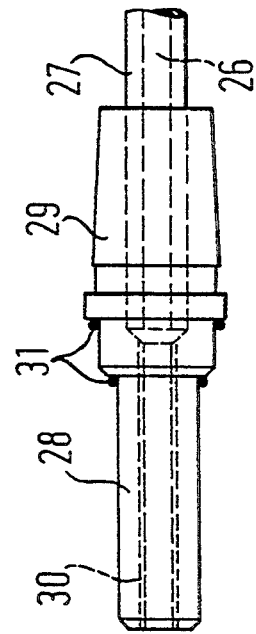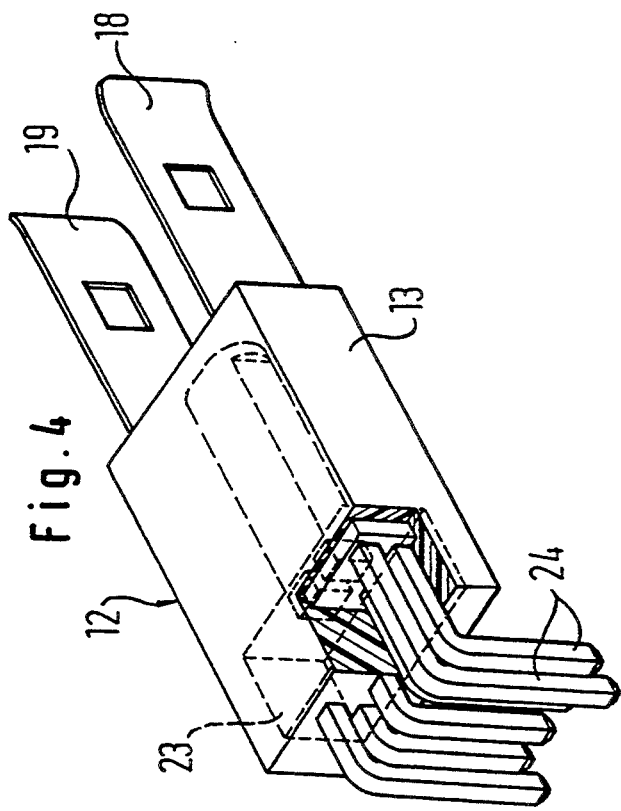

OPTICAL WAVEGUIDE CONNECTOR

This is a continuation of application Ser. No. 07/969,226 filed as PCT/EP92/00934, Apr. 29, 1992 now abandoned.

BACKGROUND OF THE INVENTION

The instant invention is concerned with an optical waveguide connector of the kind specified in the preamble of claim 1, said connector being preferentially made from plastic material.

Connectors of the specified kind of which various types are known are used for connecting, coupling and, if desired, branching optical waveguides which exist in the form of multi-fibre strands of glass or monofilament plastic conductors having diameters of from about 0.25 to 1.2 mm. In contrast to conventional electrical connectors in which current is passed via the conductive surfaces of relatively large metallic pins and metallic sleeves, with optical waveguides the transmission of signals is naturally possible only via the faces of the fibre ends, requiring precisely aligned positioning thereof in the male part as well as the female part of the connector with a minimum and constant distance between the two end faces. Moreover, the mechanically delicate fibre ends must be firmly secured in the housings of the connector parts so as to ensure exact locating of the fibre ends even under mechanical loads.

With conventional connectors for optical waveguides, especially monofilament synthetic plastic waveguides, the housings of male and female parts are normally composed of several pieces of plastics, metal or ceramics. The end portions of one or plural optical waveguides are fixed by various clamping and fixing elements in their respective housings such that their end faces, which may be polished, are precisely opposite each other when the connector parts have been mated. Apart from the high manufacturing costs and excessive assembly work due to the fact that the housing is a multi-part housing, these known connectors suffer from the further drawbacks that the delicate surface layers of the bared fibre ends might be damaged by the fixing elements on assembly and/or on account of tensile and compressive forces. Moreover, the multi-part housings are neither gas-tight nor liquid-tight so that the respective fibre ends may be attacked and damaged by moisture and aggressive media. Finally, conventional connectors for connecting two and more parallel optical waveguides have considerable dimensions. When two and more optical waveguides are used in a single cable the individual fibres must be parted and coupled to each other by separate connectors.

It is the objective of the instant invention to provide a connector for optical waveguides, especially monofilament plastic waveguides, which is easy and inexpensive to manufacture with small dimensions and which ensures precise and secure mutual alignment and fixing of the connected fibre ends even under mechanical loads.

SUMMARY OF THE INVENTION

In accordance with the instant invention the specified objective is achieved by the characterizing features of patent claim 1. Due to the integral configuration of the plastic housing of the male part and possibly also of the female or receptacle part the manufacturing process can be considerably simplified because it is merely necessary to place the previously bared fibre ends in a corresponding mould which is then filled with a suitable tough plastic material. This manufacturing process results in an advantage which is important for practical use, viz. reliable sealing of the bared fibre ends as well as of the transition between the bared fibre end and the insulating wrapping. In a case where optical waveguides made from transparent plastics are used it is a further advantage that the end faces of the optical waveguides, which are important for perfect signal transmission, can easily be finished by cutting, grinding or the like, which cannot be done in a similar way with conventional connectors. In addition to that, the firm embedding of the fibre end portions within the plastic housing counteracts any axial contraction of the optical waveguide due to temperature variations because of the approximately similar coefficients of thermal expansion of the plastic materials of the optical waveguide and the housing, whereby the optical attenuation of the connector as a whole and also any changes in attenuation are beneficially influenced.

With plastic optical waveguides it has previously been considered highly problematic to coat the bared fibre end portions, because due to the high temperatures of the injected housing material serious changes in the optical properties of the fibre end portions were considered unavoidable due to excessive heating. In the manufacture of the connector according to the present invention the specified difficulties can be overcome by minimizing the wall thickness of the various housing parts and the overall volume of the injected plastic material so as to match the dimensions and the material properties of the optical waveguides used and by providing for thorough heat dissipation by means of suitable measures taken during moulding. Experiments have confirmed that no significant changes in the optical characteristics occur with end portions of plastic optical waveguides moulded with the housing-forming resin as specified by the instant invention. The continuous firm coating of the fibre end portions with the housing material also ensures reliable and precise positioning of the two end faces of the optical waveguides to be connected and offers effective protection of the delicate end portions from mechanical or other effects during manipulation and in operation. Finally, by moulding not only the end portion but also the adjacent cladding portion of the optical waveguide with the housing material it is possible to provide an additional firm connection between these two component parts.

The small dimensions of the connectors in accordance with the instant invention offer further specific advantages as to the application thereof, for instance in the case of integration in complex bus systems in confined spaces such as required for signal transmission in modern vehicles. It is especially for the connection of multi-fibre optical waveguides that the small dimensions of the connectors of the instant invention exhibit positive effects because the fibre ends can readily be accommodated in a single housing after having previously been arranged in an optimized and non-interchangeable way.

A particularly suitable embodiment of the instant invention is distinguished by the feature that the front end of the male part is provided with a protruding profiled guide projection in which the bared ends of one or several optical waveguides are embedded. In this embodiment the integral plastic housing of the female part is provided with an axial opening or recess whose shape and dimensions are matched with the profile of the guide projection of the male part. By proper profiling and the provision of centering faces and abutment shoulders it can be ensured that, when the male part has been inserted, the faces of the fibre ends embedded therein are precisely opposite to the fibre ends embedded in the female part, while any jamming of the two parts during insertion is prevented on account of the high mechanical stability of the guide projection formed on the male part and the relatively large guide surfaces. The cross-sectional profiles and/or the cooperating centering faces act to prevent any anti-rotation and any interchange of the fibres upon insertion of the male part.

In order to maintain the connection between the fibres also upon the action of undesirable pull-out forces a further embodiment of the invention is provided with locking elements which in the moulded plastic housing of the female part may be configured as two parallel resilient tabs which project from the front and which after complete insertion of the male part engage about locking noses formed integrally with said male part.

So as not to detrimentally affect the optical characteristics of the end portions of the plastic optical waveguides due to the heat liberated upon moulding it is also suitable that at least the bared ends of the optical waveguides are coated with a thermally insulating protective sheath which may also have bonding properties.

Further particularities and advantages of the connector according to the present invention will be apparent from the following description of several preferred embodiments thereof. In the drawing

BRIEF DESCRIPTION OF THE DRAWINGS

FIGS. 1A and 1B are a perspective side view and a longitudinal sectional view, respectively, illustrating a connector male part with two optical waveguides;

FIGS. 2A and 2B are a perspective view and a longitudinal sectional view, respectively, illustrating a female part for the male part of FIG. 1;

FIG. 3 is a schematic side view of another embodiment of a connector;

FIG. 4 is a partially cut-away perspective view of the female part of FIG. 3;

FIG. 5 is a schematic side view of a male part for a single optical waveguide only.

DETAILED DESCRIPTION OF THE INVENTION

The male part 1 illustrated in FIG. 1 comprises a plastic housing 2 having two axially parallel optical waveguides 3, 4 embedded therein by moulding. Each of the optical waveguides is surrounded by a protective sheath 5, 6. As illustrated, said protective sheaths 5, 6 have been removed at the front end portions of the two optical waveguides 3, 4. The male part 1 has a single profiled forward projection 7 of plastic material integral with the housing 2 and having the bared end portions of the two optical waveguides 3, 4 extending therein The projection 7 extends axially forward and is intended to function as a guide projection. The top of this axially extending projection 7 has a planar centering surface 8 formed thereon which terminates in a shoulder 9. Also, two laterally obliquely protruding projections 10, 11 are integral with the rear end of the housing 2 to constitute locking elements.

The female part 12 illustrated in FIG. 2 comprises an integrally moulded plastic housing 13 in which a central through-opening or recess 14 is formed the cross-section of which matches the cross-sectional profile of the guide projection 7 of the male part 1. One of the narrow edges of said recess 14 is formed with a planar centering surface 15 for cooperation with the centering surface 8 formed on the projection 7 of the male part 1 when the two parts are mated. The end of said centering surface 15 is provided with a shoulder 16. For locking the two parts 1 and 12 in the fully mated state, two resilient tabs 17, 18 of metal or a suitable plastic material are embedded in the housing 13 on either side of the recess 14, cut-outs 19, 20 being respectively punched from their forwardly protruding portions. The free ends of these resilient tabs are turned up to facilitate pushing over the top and bottom surfaces of the male part housing 2. In the fully mated position the inclined projections 10, 11 have entered the punched cut-outs 19, 20 of the resilient tabs 17, 18 so that both parts are locked against pull-out forces.

For mating of the male part illustrated in FIG. 1 said part is rotated by 180° about the longitudinal axis thereof so that the centering surface 8 shown at the top in FIG. 1 will be the bottom surface. By a further rotating movement the male part is then inserted into the female part 12 such that its guide projection 7 can be pushed into the recess 14 of the female part 12 from the left end as viewed in FIG. 2.

The embodiment of the connector in accordance with the instant invention as illustrated in FIG. 3 substantially corresponds to the one illustrated in FIGS. 1, 2 so that similar elements have been given corresponding reference numerals. The upper and lower walls of the housing of the male part are provided with longitudinally extending grooves 21, 22 which are extensions of the projections 10, 11 and in which the two projecting portions of the resilient tabs 17, 18 are guided when the male part 1 is mated with the female part 2.

The female part 12 likewise comprises an integral plastic housing in the rearward portion of which an opto-electronic transducer 23 is embedded from which electrical pins 24 are led out from the housing either straight or bent over as illustrated in FIG. 4. Disposed on the transducer are two elements 25 which, when the male part 1 is fully inserted, will be precisely opposite the end faces of the optical fibres 3, 4 which terminate at the front end of projection 7. The connector illustrated in FIG. 5 is designed only for a single optical fibre 26 the sheath 27 of which has been removed in the forward end portion so that the bared end portion of the optical fibre 26 extends in a guide projection 28, which in this case is cylindrical, and terminates in the end face of said projection. Here, too, the housing 29 is an integral member made from a suitable plastic material. To prevent excessive heating of the bared end portion of the optical fibre during injection of the hot plastic material into the mould, said end portion may be provided prior to moulding with a thermally insulating coat 30, and said coat 30 may also function as a bonding agent. It is also possible to mould the optical fibre 26 without such a protective coat 30.

As will be apparent from FIGS. 3 and 5, a sealing O-ring 31 is disposed on the front wall of the male part housing 2, 29 to provide for reliable sealing of the two housings and maintain the fully mated connector parts at a certain tension due to its inherent elasticity, whereby the positioning accuracy and the resistance to external influences such as vibrations are substantially improved.

The invention is not limited to the illustrated embodiments thereof. It is possible, for instance, to provide different locking means for firm mutual locking of the male part to the female part, such as projecting resilient tabs which extend completely within the housings. Moreover, for special applications it is also possible to provide two or more projections instead of the single guide projection 7 on the male part for insertion into a corresponding number of recesses formed in the female part and for enclosing a respective single optical fibre. However, for stability the integral design of the guide projection as illustrated in the drawing should be preferred. Moreover, the male part housings may also be prefabricated from plastic material. When repairs are to be carried out it is then possible to bare the ends of the optical fibres in a suitable way and insert them in the appropriate openings of the housing parts where they are permanently and sealingly fixed by moulding with a suitable plastic material.

I claim:

1. A connector for single-fibre and multi-fibre optical waveguides, said connector comprising:
   a male part and a female part each having a plastic housing with guide and locking elements, end portions of the optical waveguides to be connected being secured coaxially within said housings,
   wherein the plastic housing (2) of the male part (1) is integrally molded onto the end portions of optical waveguides (3,4) and sealingly secured by the molding to the end portions and, wall thickness of the plastic housing of the male part, in an area around the end portions of the optical waveguides, is molded with a suitable thickness, dependent on the material characteristics of the used optical waveguides, such that a sufficient heat elimination during the molding process can occur to prevent serious changes in optical properties of the optical waveguides.

2. The connector as claimed in claim 1, characterized in that the front of the male part (1) is formed with a protruding profiled guide projection (7) having the bared ends of the optical waveguides (3, 4) embedded therein.

3. The connector as claimed in claim 2, characterized in that the end faces of the guide projections are fine machined together with those of the optical waveguides.

4. The connector as claimed in claim 1, characterized in that the guide projection (7) is formed with at least a centering surface (8) and an end abutment (9).

5. The connector as claimed in claim 1, characterized in that the integral plastic housing (13) of the female part (12) includes an axial opening (14) with an internal centering surface (15) and an end abutment (16) whose shape and dimensions are matched with the cross-sectional profile of the guide projection (7) of the male part (1).

6. The connector as claimed in claim 5, characterized in that two parallel resilient tabs (17, 18) projecting from the front are embedded as locking elements in the moulded plastic housing (13) of the female part (12), said resilient tabs in the fully mated position of the male part engaging about locking protrusions (10, 11) on the side of said male part.

7. The connector as claimed in claim 5, characterized in that opto-electronic components (23) having terminal pins (24) on one side thereof and light-conducting posts (25) on the opposite side are moulded within the plastic housing (13) of the female part (12).

8. The connector as claimed in claim 1, characterized in that the optical waveguides (3, 4, 26) have bared ends that are coated with a thermally insulating protective sheath which also exhibits bonding properties.

9. The connector claim in claim 1, characterized in that at least one elastically deformable sealing ring (31) is disposed intermediate the contacting faces of the two plastic housings (2; 13).

10. The connector as claimed in claim 1, characterized in that the plastic housings (2; 13) of the male part (1) and the female part (12), respectively, are pre-fabricated and that the bared end portions of the optical waveguides (3, 4; 26) are fixed in the respective housing by molding with a plastic material.

11. An optical waveguide connector system for connecting a first optical member (23) to a second optical member, the second optical member comprising an optical waveguide (3, 4), the system comprising:
   a first housing (13) connected to the first optical member (23); and
   a second housing (2) connected to the optical waveguide (3, 4), the second housing (2) being molded onto an end portion of the optical waveguide (3, 4) to sealingly secure the second housing (2) with the optical waveguide (3, 4), the first housing (13) and second housing (2) being directly connected to each other such that light from the optical waveguide (3, 4) can travel from the optical waveguide (3, 4) to the first optical member (23).

12. A system as in claim 11 wherein the first optical member comprises an opto-electronic transducer.

13. A system as in claim 11 wherein the end portion of the optical waveguide includes a thermally insulating coat (30).

14. A system as in claim 11 wherein the second housing is an integral one-piece housing.

15. A system as in claim 14 wherein the second housing comprises a male projection (7) and the first housing comprises a female recess (14) with the projection being located in the recess.

16. A method of making a connector part at an end portion of an optical waveguide (3, 4), the method comprising steps of:
   removing a protective sheath (5, 6) from the end portion of the optical waveguide (3, 4); and
   molding a plastic housing (2) onto the end portion to form a sealingly secure and fixed connection between the optical waveguide (3, 4) and the housing (2).

17. A method as in claim 16 further comprising providing a thermally insulating coat (30) on the end portion prior to molding of the housing on the end portion.

18. A method as in claim 16 wherein the step of molding comprises locating the end portion in an opening of a housing part and permanently fixing the end portion and housing part together by molding with a suitable plastic material between the end portion and housing part.

19. A method as in claim 16 wherein the step of molding comprises molding the entire plastic housing as an integral one-piece member onto the end portion at one time.

20. A system as in claim 11 wherein wall thickness of the second housing, in an area around the end portion of the optical waveguide (3,4), is molded relatively small such that a sufficient heat dissipation occurs during molding to prevent serious changes in optical properties of the optical waveguides.

21. A method as in claim 16 wherein the step of molding comprises molding the plastic housing at an area around the end portion of the optical waveguide relatively small such that sufficient heat dissipation occurs at the end portion during molding to prevent serious changes in optical properties of the optical waveguides.

* * * * *